April 25, 1967 H. SEITER 3,316,518

CERAMIC RESISTOR CONTACTED BARRIER-FREE WITH NOBLE METAL

Original Filed Jan. 29, 1963 2 Sheets-Sheet 1

CERAMIC RESISTOR CONTACTED BARRIER-FREE WITH NOBLE METAL

Original Filed Jan. 29, 1963 2 Sheets-Sheet 2

United States Patent Office 3,316,518

Patented Apr. 25, 1967

3,316,518

CERAMIC RESISTOR CONTACTED BARRIER-FREE WITH NOBLE METAL

Hartmut Seiter, Munich, Germany, assignor to Siemens & Halske Aktiengesellschaft Berlin and Munich, a corporation of Germany.

Continuation of application Ser. No. 254,757, Jan. 29, 1963. This application Aug. 2, 1966, Ser. No. 569,762
Claims priority, application Germany, Feb. 2, 1962, S 77,855
3 Claims. (Cl. 338—25)

This is a continuation of application Ser. No. 254,757, filed Jan. 29, 1963, now abandoned.

The invention disclosed herein relates to a resistor with high temperature coefficient and is particularly concerned with the barrier-free contacting of a ceramic resistor made of doped ferroelectric crystallite particles which are sintered together, such resistor having a high temperature coefficient of its total resistance value.

It was found, in connection with the manufacture of such resistors, that they often exhibit an undesired voltage dependence of the resistance value. In order to avoid such voltage dependence or to reduce it to a harmless extent, it was proposed, according to Patent No. 3,027,529, dated Mar. 27, 1962, to provide the contacts, substantially free of barrier layers, upon the material of the resistor, and it was further proposed to use for the contacting a common metal, especially aluminum or zinc.

The relationship of the varistor effect, that is, the voltage dependence of the resistance value and the kind of the contact metal, were investigated in the course of further experiments, whereby it was found that the barrier freedom of the contacts depends greatly on the influence of the contact metal upon the ceramic material.

The provision of a substantially barrier-free contact is possible when the contacting metal is adapted to reduce the four valent metal oxide of the ferroelectric basic metal, which is contained in the ceramic material; the term "reduce" or "reducing," being used here in the sense of a reduction of the oxygen content without disturbance of the grid, such reduction being linked with an increase of the surface conductivity. This applies to the common metals noted in the above mentioned patent, since the formation enthalpy of their oxide is at least equal to or only slightly smaller than the difference of the formation enthalpies of the trivalent or four-valent oxide of the four-valent metal in the ferroelectric basic material.

According to the above noted patent, the formation of a contact, free of a barrier layer, therefore requires, in connection with a ceramic resistor, provision, upon the ceramic semiconductor material, of a contact metal which is adapted to reduce the four-valent metal oxide of the ferroelectric basic material contained in the ceramic body, whereby the formation enthalpy of an oxide of the contact metal is at least approximately equal to or only slightly lower than the difference of the formation enthalpies of the trivalent or four-valent oxides of the four-valent metal in the ferroelectric basic material.

It is assumed that this reduction leads to an over-doping in the surface region, thus preventing formation of a barrier layer.

The experimental results shall now be discussed with reference to an example of an embodiment illustrated in the accompanying drawings.

Figure 1:
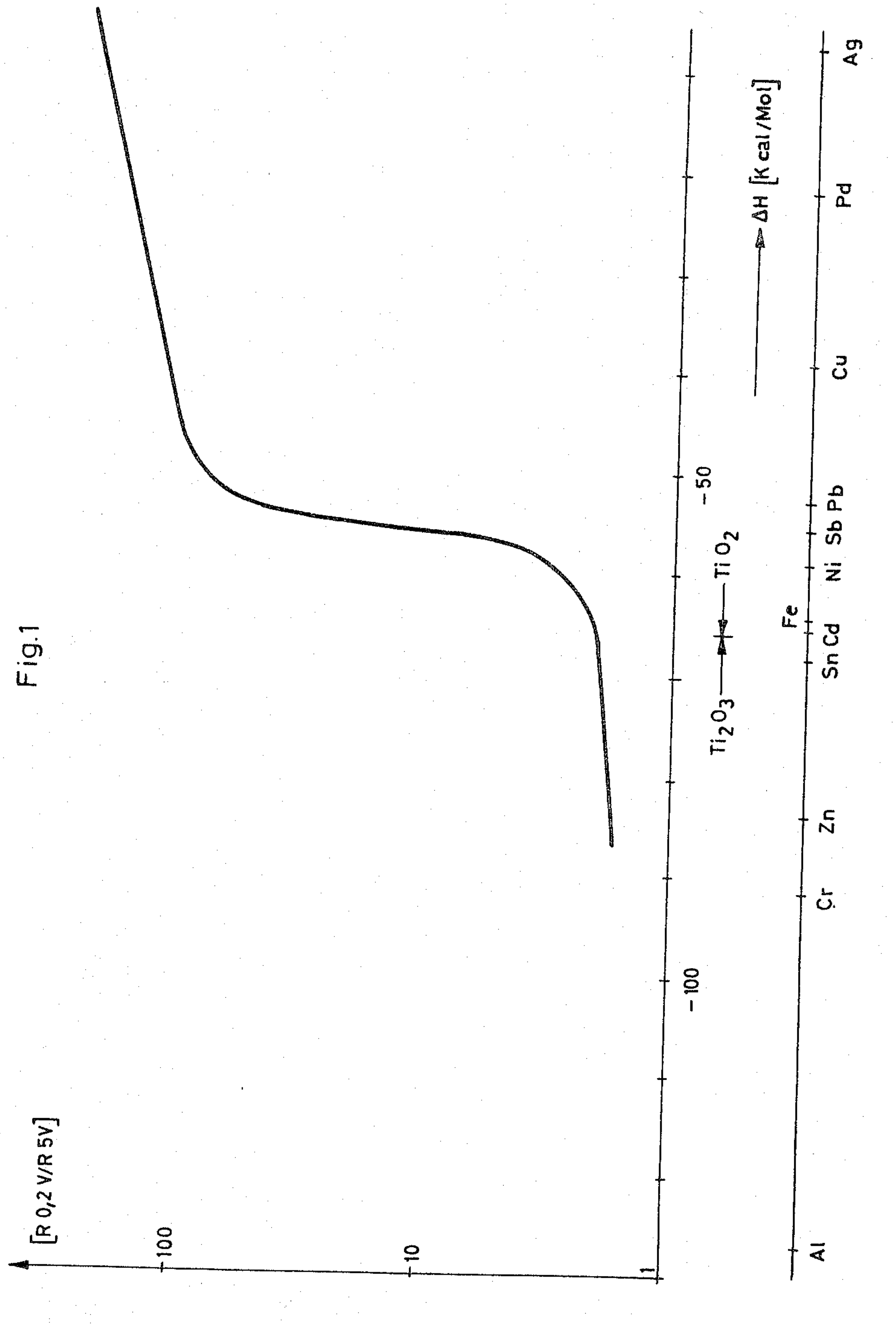
Figure 2:
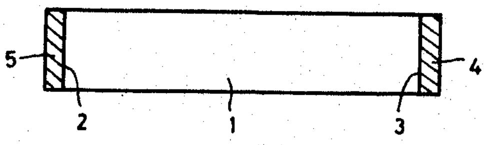
Figure 3:
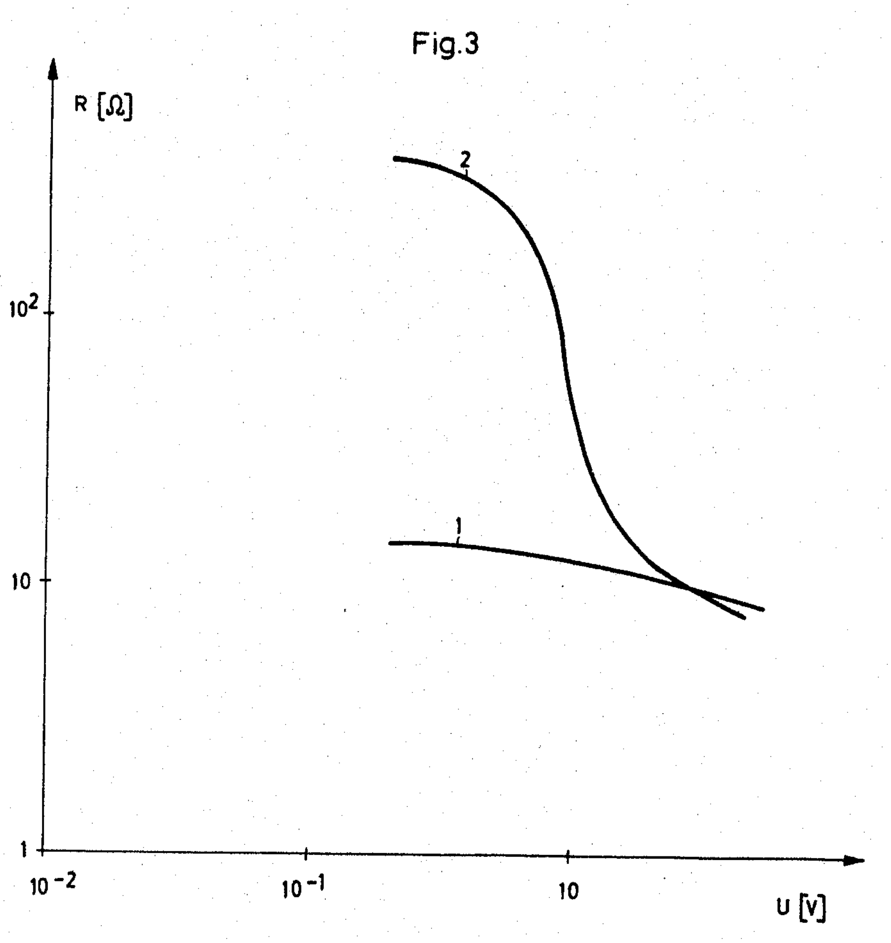

FIG. 1 explains the formation enthalpy $\Delta H$ of the metal oxides with respect to the varistor effect;

FIG. 2 shows an example of an embodiment of a resistor according to the invention; and FIG. 3 is a graph showing the resistance course of a resistor body which is contacted barrier-free.

In connection with the illustrated example, the formation enthalpy of the oxide of the contact metal was used as a measure for the reduction function thereof. A reduction from four-valent to trivalent oxide is by this contacting metal possible, when this formation enthalpy is greater (more negative) than that of the transition of trivalent to four-valent oxide of the four-valent metal in the ferroelectric basic material.

As indicated before, FIG. 1 shows the formation enthalpy $\Delta H$ of the metal oxide (respectively referred to 1 atom oxygen) plotted against the varistor effect. The resistance condition at the measuring voltage 0.2 and 5 volts (R 0.2 v./R 5 v.) was thereby used as a reference value for the varistor effect. An alteration of the resistance or of the doping does not change anything with respect to the basic differences of the varistor effect at different metals. Instead of the formation enthalpy $\Delta H$, there should be, more accurately, entered the free formation enthalpy which results from $\Delta H$ with consideration of the entropy. However, this correction of the formation enthalpy amounts at the most to 3 kcal./mole and therefore is unimportant.

The formation enthalpy of the transition from $Ti_2O_3$ to $TiO_2$ amounts, according to the equation $$2TiO_2=Ti_2O_3+1/2O_2 \text{ to } \Delta H=-62.5 \text{ kcal./mole}$$

It will be seen from FIG. 1 that a considerable reduction of the varistor effect takes place in case of a contact metal having a negative oxide forming enthalpy greater than about +55 kcal./mole, and that a substantially barrier-free contact can be obtained with a metal having a negative oxide forming enthalpy greater than about +60 kcl./mole. Accordingly, practically no varistor effect occurs in the thermodynamic existance range of the $Ti_2O_3$, becoming, however, very pronounced in the region in which no reduction of the $TiO_2$ is possible. It will also be seen from FIG. 1 that the varistor effect lies with silver approximately one tens power higher than in the case of comparable metal as, for example, palladium.

It can be assumed, based upon these results, that the ferroelectric material, especially a perovskite formed of divalent and four-valent metals, primarily the barium titanate, is incident to the contacting reduced in place on the surface, thereby becoming strongly conductive, so that no barrier effect can anymore appear.

In order to avoid being bound to the use of common contacting metals, the ceramic body is according to the invention reduced on the surface along the regions of areas thereof which are to be contacted. This may be advantageously done, for example, by electrolytically separating hydrogen at the surface of the ceramic body. The use of the glow effect, that is, of producing a glow discharge at the surface, is often likewise of advantage. A noble metal, especially a metal which can be soldered well, for example, copper, and which would have a strong varistor effect without the surface reduction, is after the reduction precipitated while the reducing condition is maintained. A barrier-free contact is thereby likewise formed, and the ceramic body is thus contacted in electrically satisfactorily and solderable manner.

FIG. 2 shows an embodiment of a resistor according to the invention. Numeral 1 indicates the rod-shaped resistor body which is sintered of ferroelectric crystallites, such body particularly consisting of a ceramic semiconductor built up on a barium titanate basis. The end surfaces of the resistor body are provided with metal coatings indicated at 4 and 5, which are, for example, electrolytically separated and consist, for example, of copper having an oxide-forming enthalpy amounting to about −38 kcal./mole, which is, accordingly, lower (more positive) than the formation enthalpy of the transition from four-valent to trivalent titanium oxide. The contact is nevertheless barrier-free since the end surfaces 2 and 3 are prior to providing the noble metal thereon, reduced, for example, by conducting thereover a hot reducing gas. The metal layers or coatings may also be produced, for example, by vaporization instead of electrolytically.

In FIG. 3, the resistance is entered along the ordinate and the voltage along the abscissa, both on a logarithmic scale. The curve 1 shows the resistance course of a resistor body which is contacted barrier-free. There is practically no varistor effect. The curve 2 represents the resistance course of a resistor body which is contacted with copper without previous reduction of the contact area. The formation enthalpy of the copper oxide amounts to about −38 kcal./mole. The curve 2 shows a strong voltage dependence of the resistor, which is due to the conditions described before.

Changes may be made within the scope and spirit of the appended claims which define what is believed to be new and desired to have protected by Letters Patent.

I claim:

1. A ceramic semiconductor resistor comprising a body having opposite end surfaces and consisting of sintered together doped ferroelectric crystallite particles with perovskite-structure from two-valent and four-valent metals with high positive temperature coefficient of resistance and with a substantially negligible voltage dependence of the entire resistance, the ceramic semiconductor body being provided at the opposite end surfaces thereof with barrier-free contact areas by conducting a hot reducing gas thereover, a pair of barrier-free metal contact layers each disposed on a respective opposite end surface of said body, said contact layers being a noble metal which is ineffective to reduce the four-valent metal oxide of the ferroelectric material contained in said body, said device having a characteristic such that the negative oxide-forming enthalpy of said noble metal is smaller than the formation enthalpy of the transisition from $Ti_2O_3$ to $TiO_2$.

2. A resistor according to claim 1, wherein the ferroelectric material of said body contains titanium, and wherein the negative oxide-forming enthalpy of said contact metal is at least smaller than 60 kcal./mole.

3. A resistor according to claim 1, wherein the negative oxide-forming enthalpy of said contact metal is smaller than 55 kcal./mole.

References Cited by the Examiner

UNITED STATES PATENTS

| | | | |
|---|---|---|---|
| 2,528,113 | 10/1950 | Carlson et al. | 252—520 |
| 2,833,676 | 5/1958 | Heibel et al. | 117—213 |
| 2,892,107 | 6/1959 | Williams et al. | 252—62.9 |
| 2,985,700 | 5/1961 | Johnston | 252—520 |
| 2,989,481 | 6/1961 | Miller | 252—62.9 |
| 3,056,938 | 10/1962 | Pappis et al. | 252—520 |
| 3,105,800 | 10/1963 | Watanable | 252—520 |

FOREIGN PATENTS

| | | |
|---|---|---|
| 733,248 | 7/1955 | Great Britain. |

RICHARD M. WOOD, *Primary Examiner.*

W. D. BROOKS, *Assistant Examiner.*